(12) United States Patent
Ramaswamy et al.

(10) Patent No.: US 9,058,613 B2
(45) Date of Patent: Jun. 16, 2015

(54) HYBRID ADVERTISING CAMPAIGN

(75) Inventors: Sridhar Ramaswamy, Cupertino, CA (US); Angela Chunwah Lai, Mountain View, CA (US); Mark A. Foltz, San Francisco, CA (US); Ariel H. Bardin, Belmont, CA (US); Julie Black, Mountain View, CA (US); Joerg Heilig, Los Altos, CA (US); Thomas R. Stanis, Saratoga, CA (US)

(73) Assignee: Google Inc., Mountain View, CA (US)

( * ) Notice: Subject to any disclaimer, the term of this patent is extended or adjusted under 35 U.S.C. 154(b) by 693 days.

(21) Appl. No.: 13/269,154

(22) Filed: Oct. 7, 2011

(65) Prior Publication Data
US 2012/0089459 A1 Apr. 12, 2012

Related U.S. Application Data

(63) Continuation of application No. 12/033,590, filed on Feb. 19, 2008, now Pat. No. 8,036,936.

(51) Int. Cl.
*G06Q 30/02* (2012.01)
(52) U.S. Cl.
CPC ............ *G06Q 30/02* (2013.01); *G06Q 30/0243* (2013.01); *G06Q 30/0251* (2013.01); *G06Q 30/0254* (2013.01)
(58) Field of Classification Search
CPC .................... G06F 17/30867; G06F 17/30864; G06Q 30/02; G06Q 30/0243; G06Q 30/0251; G06Q 30/0254
USPC ......... 707/705, 706, 707, 708, 709, 710, 724, 707/726, 749, 750, 758, 944; 705/1.1, 14.4, 705/14.2, 14.46, 14.49, 14.51, 14.55, 14.57, 705/14.58, 14.6, 14.69, 14.73, 26.3, 14.42
See application file for complete search history.

(56) References Cited

U.S. PATENT DOCUMENTS

| 7,478,089 | B2 | 1/2009 | Henkin et al. |
| 2005/0049395 | A1 | 3/2005 | Prusiner et al. |
| 2005/0187818 | A1 | 8/2005 | Zito et al. |
| 2006/0242013 | A1 | 10/2006 | Agarwal et al. |
| 2006/0282328 | A1* | 12/2006 | Gerace et al. .................. 705/14 |
| 2007/0038516 | A1 | 2/2007 | Apple et al. |
| 2007/0150347 | A1* | 6/2007 | Bhamidipati et al. .......... 705/14 |

(Continued)

FOREIGN PATENT DOCUMENTS

| JP | 2001306608 A | 11/2001 |
| JP | 200263403 A | 2/2002 |

(Continued)

OTHER PUBLICATIONS

Supplementary European Search Report for EP09713604 dated Oct. 11, 2012, 2 pages.

(Continued)

*Primary Examiner* — Greta Robinson
(74) *Attorney, Agent, or Firm* — Fish & Richardson P.C.

(57) ABSTRACT

Keywords and placement criteria related to a campaign are received. An advertisement request that specifies a web property, e.g., a web page, is received, and keywords and placement criteria that are satisfied by the web property are identified. Based on the identified keywords and placement criteria, an advertisement to be provided with the web property is selected.

21 Claims, 4 Drawing Sheets

(56) References Cited

U.S. PATENT DOCUMENTS

| | | | |
|---|---|---|---|
| 2007/0220040 A1* | 9/2007 | Do | 707/102 |
| 2008/0154700 A1 | 6/2008 | Lester et al. | |
| 2008/0235088 A1 | 9/2008 | Weyer et al. | |
| 2009/0171764 A1 | 7/2009 | Bellaiche et al. | |

FOREIGN PATENT DOCUMENTS

| | | |
|---|---|---|
| JP | 2006508472 | 3/2006 |
| JP | 2006268771 A | 10/2006 |
| JP | 2007524894 A | 8/2007 |
| JP | 2008538625 | 2/2010 |
| KR | 2005032076 A | 4/2005 |
| KR | 2006025726 A | 3/2006 |
| WO | 2004051418 | 6/2004 |
| WO | WO2006115508 A3 | 1/2007 |

OTHER PUBLICATIONS

Statement in Accordance With the Notice From the European Patent Office Dated Oct. 1, 2007 Concerning Business Methods—Nov. 1, 2007, Xp007905525, p. 592-593.

Canadian Office Action Application No. 2,715,889, dtd. Apr. 30, 2013, pp. 1-4.

Japanese Office Action, Application No. 2010-547655, dated Jun. 11, 2013, with English translation, 4 pages.

European Office Action, Application No. 09713604.8, dated Nov. 23, 2012, 5 pages.

Decision of Rejection w/English Translation for JP 2010-547655, 4 pages.

Notification of Transmittal of the International Search Report and the Written Opinion of the International Searching Authority, or the Declaration for Application No. PCT/US2009/030339, dated Jun. 17, 2009, 11 pages.

Notification Concerning Transmittal of International Preliminary Report on Patentability, for Application No. PCT/US2009/030339, 6 pages.

Non-Final Office Action, Notice of Reasons for Rejection for JP Appl. No. 2010-547655 mailed on Jan. 29, 2013 w/English Translation, 6 pages.

Canadian Office Action in Canadian Application No. 2,715,889, dated Dec. 13, 2013, 4 pages.

* cited by examiner

HYBRID ADVERTISING CAMPAIGN

CROSS-REFERENCE TO RELATED APPLICATIONS

This application is a continuation application of and claims priority to U.S. application Ser. No. 12/033,590, filed on Feb. 19, 2008, entitled "HYBRID ADVERTISING CAMPAIGN SYSTEM," now U.S. Pat. No. 8,036,936, the entirety of which is hereby incorporated herein by reference.

BACKGROUND

This specification relates to online advertising.

The rise of the Internet has enabled access to a wide variety of content items, e.g., video and/or audio files, web pages for particular subjects, news articles, etc. Such access to these content items has likewise enabled opportunities for targeted advertising. For example, content items of particular interest to a user can be identified by a search engine in response to a user query. One example search engine is the Google search engine provided by Google Inc. of Mountain View, Calif., U.S.A. The query can include one or more search terms, and the search engine can identify and, optionally, rank the content items based on the search terms in the query and present the content items to the user (e.g., according to the rank). This query can also be an indicator of the type of information of interest to the user. By comparing the user query to a list of keywords specified by an advertiser, it is possible to provide targeted advertisements to the user.

Another form of online advertising is advertisement syndication, which allows advertisers to extend their marketing reach by distributing advertisements to additional partners. For example, third party online publishers can place an advertiser's text or image advertisements on web pages that have content related to the advertisement. As the users are likely interested in the particular content on the publisher webpage, they are also likely to be interested in the product or service featured in the advertisement. Accordingly, such targeted advertisement placement can help drive online customers to the advertiser's website.

SUMMARY

This specification describes technologies relating to online advertising. In general, one aspect of the subject matter described in this specification can be embodied in methods that include the actions of receiving placement criteria associated with a campaign; receiving keywords associated with the campaign; receiving a content item request for a content item defining a web property for which a content item is to be provided; identifying the placement criteria satisfied by the web property; identifying the keywords satisfied by the web property; and identifying a content item to be provided with the web property, the content item associated with the campaign, and associated with the keywords satisfied by the web property and associated with placement criteria satisfied by the web property.

These and other embodiments can optionally include one or more of the following features. The methods can include the actions of evaluating the content of the web page, associating a page keyword with the web page, the page keyword corresponding to the content of the web page, and identifying the web page that is associated with the page keyword that is related to the target keyword. Additionally, the methods can optionally include the action of receiving an advertisement bid that specifies a price an entity will pay to have the content item provided with the web page that has content relevant to the target keyword and is a member of the placement.

The placement criteria can be domain features, web page features, or other criteria. The domain features can be one or more of a website address, a URL, a content type, or a website category. The web page features can be one or more of a web page address, a URL, a content type, or a web page category. The content item can be an advertisement. The advertisement bids can be constant for advertisements provided with any web page that is relevant to the target keyword. The advertisement bids can vary according to the placement criteria.

Particular embodiments of the subject matter described in this specification can be implemented so as to realize one or more of the following advantages. One advantage realized is the ability to define a more precise target for advertising campaigns. Another advantage is the ability to use site targeting and content targeting within a single advertising campaign. Still another advantage is flexible bidding based on placement criteria and target keywords. These advantages can be separately realized or realized in combination in various implementations.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
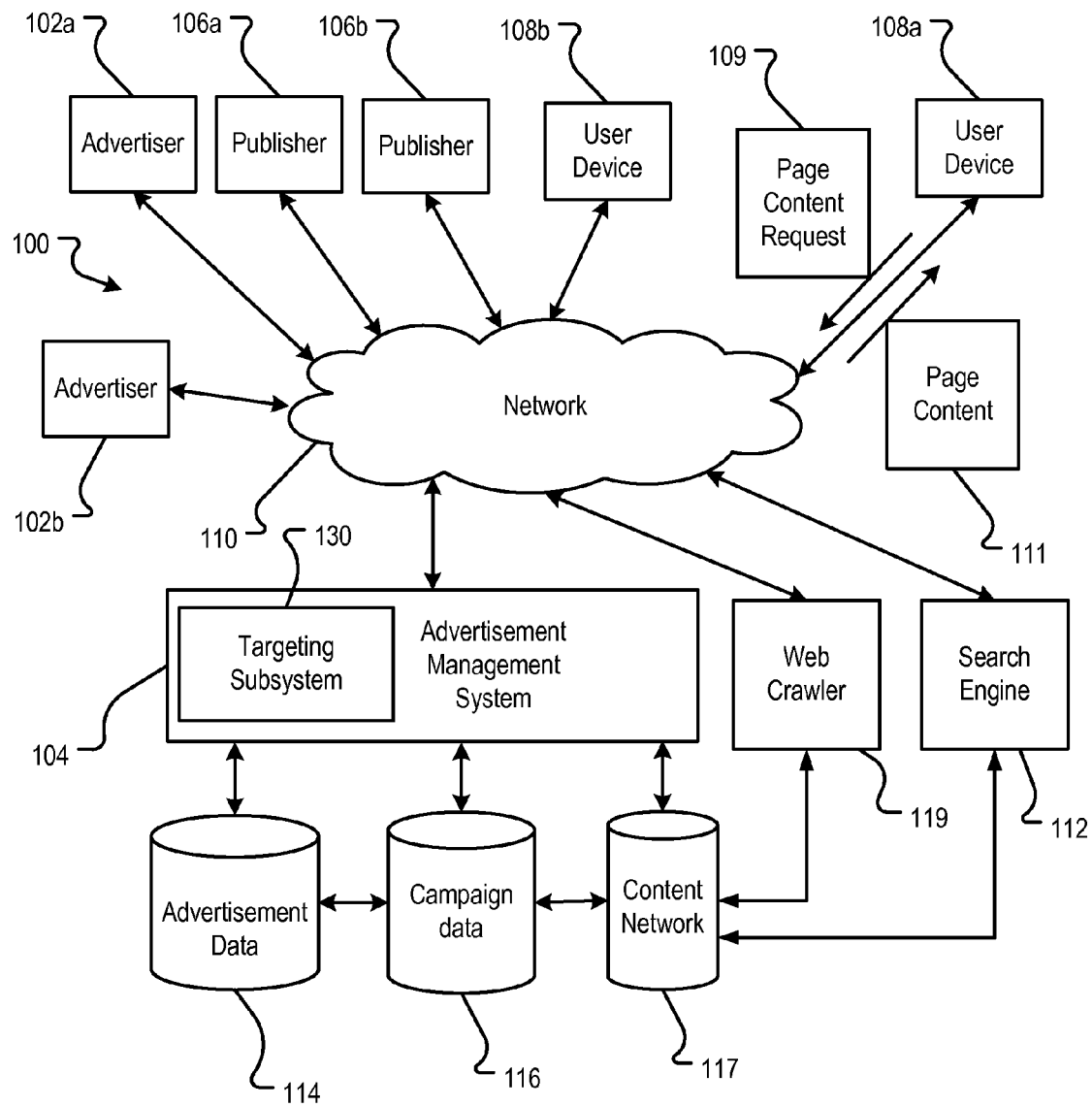
FIG. 1 is a block diagram of an example online advertising environment.

FIG. 1 is a block diagram of an example online advertising environment 100. The online environment 100 can facilitate the identification and serving of content items, e.g., web pages, advertisements, etc., to users. A computer network 110, such as a local area network (LAN), wide area network (WAN), the Internet, or a combination thereof, connects advertisers 102a and 102b, an advertisement management system 104, publishers 106a and 106b, user devices 108a and 108b, and a search engine 112. Although only two advertisers (102a and 102b), two publishers (102a and 102b) and two user devices (108a and 108b) are shown, the online environment 100 may include many thousands of advertisers, publishers and user devices.

§1.0 Advertisement Publishing and Tracking

In some implementations, one or more advertisers 102a and/or 102b can directly, or indirectly, enter, maintain, and track advertisement information in the advertising management system 104. The advertisements can be in the form of graphical advertisements, such as banner advertisements, text only advertisements, image advertisements, audio advertisements, video advertisements, advertisements combining one of more of any of such components, etc., or any other type of electronic advertisement document 120. The advertisements may also include embedded information, such as a links, meta-information, and/or machine executable instructions, such as HTML or JavaScript™.

A user device, such as user device 108a, can submit a page content request 109 to a publisher or the search engine 112. In some implementations, the page content 111 can be provided to the user device 108a in response to the request 109. The page content can include advertisements provided by the advertisement management system 104, or can include executable instructions, e.g., JavaScript™, that can be executed at the user device 108a to request advertisements from the advertisement management system 104. Example user devices 108 include personal computers, mobile communication devices, television set-top boxes, etc.

Advertisements can also be provided to the publishers 106. For example, one or more publishers 106a and/or 106b can submit advertisement requests for one or more advertisements to the system 104. The system 104 responds by sending the advertisements to the requesting publisher 106a or 106b for placement on one or more of the publisher's web properties (e.g., websites and other network-distributed content). The advertisements can include embedding links landing pages, e.g., pages on the advertisers 102 websites, that a user is directed to when the user clicks an ad presented on a publisher website. The advertisement requests can also include content request information. This information can include the content itself (e.g., page or other content document), a category corresponding to the content or the content request (e.g., arts, business, computers, arts-movies, arts-music, etc.), part or all of the content request, content age, content type (e.g., text, graphics, video, audio, mixed media, etc.), geo-location information, demographic information, keywords associated with the content, etc.

In some implementations, a publisher 106 can combine the requested content with one or more of the advertisements provided by the system 104. This combined page content 109 and advertisements can be sent to the user device 108 that requested the content (e.g., user device 108a) as page content 111 for presentation in a viewer (e.g., a browser or other content display system). The publisher 106 can transmit information about the advertisements back to the advertisement management system 104, including information describing how, when, and/or where the advertisements are to be rendered (e.g., in HTML or JavaScript™).

Publishers 106a and 106b can include general content servers that receive requests for content (e.g., articles, discussion threads, music, video, graphics, search results, web page listings, information feeds, etc.), and retrieves the requested content in response to the request. For example, content servers related news content providers, retailers, independent blogs, social network sites, or any other entity that provides content over the network 110 can be a publisher.

Advertisements can also be provided through the use of the search engine 112. The search engine 112 can receive queries for search results. In response, the search engine 112 can retrieve relevant search results from an index of documents (e.g., from an index of web pages). An exemplary search engine 112 is described in the article S. Brin and L. Page, "The Anatomy of a Large-Scale Hypertextual Search Engine," Seventh International World Wide Web Conference, Brisbane, Australia and in U.S. Pat. No. 6,285,999. Search results can include, for example, lists of web page titles, snippets of text extracted from those web pages, and hypertext links to those web pages, and may be grouped into a predetermined number of (e.g., ten) search results.

The search engine 112 can also submit a request for advertisements to the system 104. The request may include a number of advertisements desired. This number may depend on the search results, the amount of screen or page space occupied by the search results, the size and shape of the advertisements, etc. The request for advertisements may also include the query (as entered or parsed), information based on the query (such as geo-location information, whether the query came from an affiliate and an identifier of such an affiliate), and/or information associated with, or based on, the search results. Such information may include, for example, identifiers related to the search results (e.g., document identifiers or "docIDs"), scores related to the search results (e.g., information retrieval ("IR") scores), snippets of text extracted from identified documents (e.g., web pages), full text of identified documents, feature vectors of identified documents, etc. In some implementations, IR scores can be computed from, for example, dot products of feature vectors corresponding to a query and a document, page rank scores, and/or combinations of IR scores and page rank scores, etc.

The search engine 112 can combine the search results with one or more of the advertisements provided by the system 104. This combined information can then be forwarded to the user device 108 that requested the content as the page content 111. The search results can be maintained as distinct from the advertisements, so as not to confuse the user between paid advertisements and presumably neutral search results.

The advertisers 102, user devices 108, and/or the search engine 112 can also provide usage information to the advertisement management system 104. This usage information can include measured or observed user behavior related to advertisements that have been served, such as, for example, whether or not a conversion or a selection related to an advertisement has occurred. The system 104 performs financial transactions, such as crediting the publishers 106 and charging the advertisers 102 based on the usage information. Such usage information can also be processed to measure performance metrics, such as a click-through rate ("CTR"), conversion rate, etc.

A click-through can occur, for example, when a user of a user device, selects or "clicks" on a link to a content item returned by the publisher or the advertising management system. The CTR is a performance metric that is obtained by dividing the number of users that clicked on the content item, e.g., a link to a landing page, an advertisement, or a search result, by the number of times the content item was delivered. For example, if a link to a content item is delivered 100 times, and three persons click on the content item, then the CTR for that content item is 3%. Other usage information and/or performance metrics can also be used.

A "conversion" occurs when a user consummates a transaction related to a previously served advertisement. What constitutes a conversion may vary from case to case and can be determined in a variety of ways. For example, a conversion may occur when a user clicks on an advertisement, is referred to the advertiser's web page, and consummates a purchase there before leaving that web page. A conversion can also be defined by an advertiser to be any measurable/observable user action such as, for example, downloading a white paper, navigating to at least a given depth of a Website, viewing at least a certain number of Web pages, spending at least a predetermined amount of time on a Website or Web page, registering on a Website, etc. Other actions that constitute a conversion can also be used.

§2.0 Advertisement Auctioning and Management

In addition to the advertisements being selected based on content such as a search query or web page content of a publisher, the advertisements can also be selected from an auction. In one implementation, the advertisement management system 104 includes an auction process. Advertisers 102 may be permitted to select, or bid, an amount the advertisers are willing to pay to have the advertisement provided with an identified web page. Similarly, advertisers 102 may be permitted to select, or bid, an amount the advertisers are willing to pay for each click of an advertisement, e.g., a cost-per-click amount an advertiser pays when, for example, a user clicks on an advertisement. The cost-per-click can include a maximum cost-per-click, e.g., the maximum amount the advertiser is willing to pay for each click of advertisement based on a keyword. These bids may be used in one or more auction models, e.g., a generalized second price (GSP) auction, a Vickrey Clark Groves (VCG) auction, etc.

§3.0 Advertisement Campaigns

The advertisements, associated usage data, and bidding parameters described above can be stored as advertisement data in an advertisement data store 114. An advertiser 102 can further manage the serving of advertisement by specifying an advertising campaign. The advertising campaign can be stored in campaign data in a campaign data store 116, which can, for example, specify advertising budgets for advertisements, when, where and under what conditions particular advertisements may be served for presentation, etc. For example, a computer company may design an advertising campaign for a new laptop computer that is scheduled to be released on November 20. The advertising campaign may have a budget of $500,000, and may have 30 different advertisements that are to be served for presentation during the month of November. Such data defining the advertisement campaign can be stored in the campaign data 116.

In some implementations, advertisements that are part of a common campaign can also share common targeting options. Targeting options for a campaign can include placement targeting (e.g., site targeting, vertical targeting and demographic targeting) and keyword targeting within a content network 117.

The content network 117 is a collection of web pages and websites that are indexed based on the attributes of the web pages and websites. The attributes of the web pages and websites can include, for example, keywords that characterize the content of the web pages and websites, URLs for the web pages and websites, demographics of the visitors to the web pages and web sites, content age, content type, content categories, etc. The attributes of the web pages and websites can be identified, for example, by a search engine 112 or web crawler 119. A web crawler 119 can be a computer program or script that automatically browses and evaluates web pages to identify web pages and the associated attributes to create an index of the web pages. Other processes for gathering web page data can also be used.

Targeting options can be used individually and associated with different campaign types. For example, search/content campaigns can use, for example, keywords to identify search results pages and other web pages to target. Similarly, site targeting campaigns and reservation campaigns (e.g., campaigns that enable an advertiser to pay a flat price for a defined number of impressions on a specified web page or advertisement slot) can use, for example, a uniform resource locator (URL) to identify websites to target.

§3.1 Hybrid Campaigns

In some implementations, the targeting options can be integrated into a single campaign that facilitates the use of multiple targeting options (e.g., placement targeting and keyword targeting) in a single campaign. Placement targeting allows an advertiser 102 to select placements to target with advertisements based on placement criteria, and keyword targeting allows an advertiser 102 to target advertisements in a campaign to publisher properties (e.g., search results pages and content pages) based on target keywords. For example, a targeting subsystem 130 can be used to manage multiple targeting options.

§3.2 Placement Targeting Portion of Hybrid Campaign

In an on-line implementation, a placement is a subset of a content network 117. For example, a placement can be any web property, e.g., a website, a domain, or subset of web pages, etc., where an advertiser 102 can place content items (e.g., advertisements). In other implementations for other media, a placement can be a media property that can be used to publish a content item, such as an advertisement. In some implementations, placement criteria received by the advertisement management system 104 from the advertiser 102 can be used to identify a placement for the campaign.

Placement criteria can include domain features, web page features, or other criteria that can be satisfied independent of the keywords, or words related to the keywords, that are associated with the various web pages. Domain features refer to the features associated with a group of web pages that are part of a common domain (e.g., website). Web page features refer to the features associated with an individual web page. For example, domain features and web page features can include a URL, content age, content type, geo-location information, demographic information (e.g., demographics of users that request the content), a website and/or web page category and any other information that characterizes or categorizes the domain or web page. The placement criteria can be used to define a placement that includes all of the domains (e.g., websites), web pages, or combination of domains and web pages that satisfy the placement criteria.

For example, an advertiser 102 that determines that advertisements, or a portion of advertisements, in a campaign should be targeted to a particular web page can provide the URL associated with that web page (e.g., example.com) to the advertisement management system 104 through a user interface. In this situation, the URL for the single web page defines a placement for the campaign. In turn, the advertisement system manager 104 can identify advertisements in the campaign for presentation with the web page that is identified by the URL (e.g., example.com). Similarly, an advertiser 102 can submit multiple URLs associated with multiple web pages to define a placement that contains multiple web pages.

In some implementations, the advertiser 102 can specify that any URL corresponding to a common domain or substring of a URL can be targeted by the campaign. In the above example, the advertiser 102 can specify that any web page within the example.com domain or including a URL substring of example.com can be targeted. Accordingly, all of the web pages that are within the example.com domain or include example.com in the URL will be part of the targeted placement. For example, the individual web page that is accessed by the URL example.com/example_page will be part of the placement because its URL includes example.com. Similarly, placement criteria that identify example.com/photos as a targeted site will be satisfied by example.com/photos/august. Thus, URL placement criteria are satisfied by URLs that include the placement criteria as a substring of URL.

Another example placement can be defined placement criteria that defines categories of web pages or websites that an advertiser 102 identifies for targeting. Example categories can be based on the content or purpose of the web pages or website (e.g., social networking and news), or on the characteristics of the website traffic (e.g., traffic count and unique hits) or characteristics of the content (e.g., content age and content type). The advertisement management system 104 can receive a list of categories, e.g., news, politics, congress, or topics that characterize the websites that an advertiser 102 is targeting. In turn, the advertisement management system 104 can identify a placement that includes websites and/or web pages that are categorized as websites or web pages that are related to e.g., news, politics, congress. Accordingly, the advertisements in the campaign can be presented with the web pages and websites that define the placement.

In another example, an advertiser can specify that the websites or web pages identified for targeting should have content that meets a temporal placement criterion, e.g., content that was updated in the last 24 hours by submitting the specified characteristics to the advertisement management system 104. In turn, the advertisement management system 104 can identify a placement that includes the websites and/or web pages that have content that was updated in the last 24 hours. Accordingly, the advertisements in the campaign can be presented with the websites and/or web pages that define the placement.

Other types of placement criteria can also be used.

§3.3 Keyword Targeting Portion of Hybrid Campaign

Keyword targeting allows an advertiser 102 to target advertisements in a campaign to publisher properties (e.g., search results pages and content pages) based on target keywords. Keywords are descriptors that are created, for example, to index content for retrieval. Keywords can be created, for example, by search engines 112 or web crawlers 119 that evaluate the contents of a web page and identify words that characterize the content of the web page. Keywords that correspond to the content of the web page can be associated with the URL of the web page and stored in an index for later reference. The keywords that are associated with the URL of the web page are referred to as page keywords.

Keywords can be referenced, for example, to facilitate identification of web pages in response to search requests. A search query can be received from a user device 108*b* by a search engine 112. In turn, the search engine 112 can search the index to identify web pages that are associated with keywords that are related to the search query. The identified web pages can be listed in a search results list based, for example, on the relevance of the keywords to the search query.

Target keywords can be, for example, keywords that an advertiser 102 identifies that should be associated with a publisher's property (e.g., web page) for an advertisement to be provided with the property. Advertisers 102 can use target keywords that are related to the advertisements in a campaign to target marketing efforts. In some implementations, advertisers 102 can target advertisements to publishers' properties (e.g., web pages) that are related to the target keyword.

For example, an advertiser 102 that is advertising products/services related to event tickets can identify a sports franchise name as a target keyword for providing advertisements. Accordingly, the advertiser 102 can provide the target keyword (the sports franchise name) to the advertisement management system 104. In turn, the advertisement management system 104 can identify web pages that are associated with page keywords that are related to the sports franchise name. The advertisement management system 104 can then provide the advertiser's advertisement with the identified web pages.

In some implementations, the advertiser 102 can define the required relatedness between the target keyword and the page keyword. For example, an advertiser 102 can specify that advertisements in a particular campaign should only be presented with web pages that are associated with page keywords that exactly match the target keyword. Thus, the advertisements will not be provided with web pages that are associated with other page keywords that do not exactly match the target keyword.

Conversely, in some implementations, the advertiser 102 can define a broad relatedness as being sufficient to satisfy the target keyword. Accordingly, the advertisement management system 104 can provide the advertiser's advertisements with web pages that are associated with the page keyword, e.g., the sports franchise name, as well as web pages associated with broadly related target keywords (e.g., keywords related to the sport in which the sports franchise participates). Examples of relatedness are provided for descriptive purposes, but other levels of relatedness can be defined that allow the advertisement management system 104 to provide advertisements with web pages that are associated with page keywords with different levels of relatedness to the target keyword.

§3.4 Hybrid Targeting

In some implementations, the advertisement management system 104 can use placement criteria and target keywords to identify a placement. In these implementations, an advertiser 102 can provide target keywords that are related to the content that should be included on a publisher's property (e.g., web page) for the advertisement to be presented with the publisher's property. The advertisement management system 104, for example, can determine if a publisher property that is requesting advertisements has page keywords that are related to the target keyword. Additionally, the advertiser 102 can also specify websites (e.g., URLs and domains), or categories of websites (e.g., social networking and news) to target. In turn, the advertisement management system 104 can determine if the publisher property that is requesting advertisements satisfies the placement criteria. If both the target keywords and the placement criteria are satisfied, then the publisher's property is a placement for the advertisement and the advertisement can be presented with the publisher's property.

For example, the advertisement management system 104 can receive the target keywords "cars," "new cars" and "car dealerships" from an advertiser 102 that are associated with an advertisement. Additionally, the advertisement management system 104 can receive placement criteria that identify newspaper web pages as target websites. When the advertisement management system 104 receives request for an advertisement from a web page the advertisement management system 104 can identify attributes that are associated with the requesting web page to determine which advertisements can be presented with the requesting web page. Accordingly, if the advertisement management system 104 determines that the requesting web page has a page keyword "cars" associated with it and that the web page is a newspaper web page, then the advertisement management system 104 can determine that the web page is a placement for the advertisement. Thus, the advertisement management system 104 can use placement criteria to restrict the advertisements that are presented with web pages in the content network even if the web pages have content related to the advertisements.

In other implementations, the advertisement management system 104 identifies the placement for the advertisements by identifying the websites or web pages in the content network that satisfy the placement criteria received from the advertiser 102, as described above. The advertisement management system 104 can then use the target keywords to filter the web pages in the placement, thereby identifying web pages within the placement that satisfy the target keyword. Thus, the placement criteria and the target keywords are used to identify the web pages that can be targeted by a campaign.

For example, an advertiser 102 can specify that its advertisements be served on social networking web pages that provide content related to a sports franchise. Accordingly, the advertisement management system 104 can receive placement criteria from the advertiser 102 specifying social networking sites as target websites. Additionally, the advertiser 102 can provide the target keyword of the sports franchise name.

The advertisement management system 104 can identify an initial placement that includes web pages that are part of social networking websites regardless of the content on the web pages. The advertisement management system 104 can continue by identifying web pages within the initial placement that have content that is related to the sports franchise. The identification can be, for example, based on the page keywords that are associated with the web pages in the initial placement. The final placement will include the social networking pages that are associated with the page keyword of the sports franchise name. In turn, the advertisement management system 104 can provide the advertiser's advertisements with web pages that are part of the final placement. Thus, advertisers 102 can selectively target advertisements in a single campaign to a placement using both placement criteria and target keywords that are received by the advertisement management system 104.

§3.5 Hybrid Campaign Bidding Example

In some implementations, advertisement bids can be received from the advertisers 102 that vary according to the placement criteria and the target keywords. For example, an advertiser 102 can submit placement criteria and/or target keywords that are associated with a first bid. Similarly, the advertiser can submit different placement criteria and keywords that are associated with a second bid. Varying bids according to the placement criteria and target keywords allows an advertiser 102 to bid according to the different values that the advertiser associates with providing the advertisements with web pages having different characteristics.

For example, an advertiser 102 that sells baseball bats can determine that it will target advertisements to any little league baseball website as well as sporting goods websites that are associated with the target keywords baseball, bats and gloves. The advertiser 102 can also determine that it is more valuable to provide advertisements with the sporting goods web pages that are associated with the target keywords than to provide the advertisements with the little league websites. Accordingly, the advertiser can submit a bid (e.g., cost per click, max cost per click, cost per thousand impressions) of $1 for advertisements provided with the little league websites, while submitting a bid of $3 for advertisements provided with the sporting goods web pages that are associated with the target keywords. Thus, the advertiser 102 has varied its advertisement bid based on the placement criteria and target keywords, thereby displaying a preference for having advertisements provided with the sporting goods web pages that are associated with the target keywords by including a higher bid for these web pages.

Similarly, an advertiser 102 can submit a constant bid for advertisements provided with any website that satisfies the target keyword but vary the bid for sites that also satisfy the placement criteria. For example, an advertiser 102 can submit a bid of $1 for advertisements placed on any website that has a page keyword that satisfies the target keyword "baseball." Additionally, the advertiser 102 can submit a bid of $3 for advertisements that are presented with sporting goods websites. Thus, if the advertiser's advertisement is presented on a website that satisfies the target keyword, but is not a sporting goods website, the advertiser's bid will be $1, but if the website is also a sporting goods then the advertiser's bid will be increased to $3. While providing a higher bid that is associated with websites having particular placement criteria, the advertiser 102 can provide a lower bid (e.g., $0.50) for advertisements presented with web pages having other identified placement criteria. Thus, placement criteria can be used as an advertisement bid modifier.

In some implementations, an advertiser 102 can submit overlapping bids for different placement criteria or target keywords. For example, the advertiser 102 can submit a bid of $1 for an advertisement when presented with any web page that is part of the example.com domain. Additionally, the advertiser 102 can submit a bid of $3 for the advertisement when presented with the web page example.com/news. In this situation, the advertiser's bid can be the most specific bid for the web page space that is being auctioned. For example, if the web page example.com/news is being auctioned then the $3 bid can be used rather than the $1 bid. Similarly, the $1 bid will be used for all other web pages that are part of the example.com domain.

A similar bid selection process can be used when an advertiser 102 submits overlapping bids for different target keywords. For example, an advertiser 102 can submit a bid of $1 for an advertisement presented with a web page that is broadly related to the target keyword "baseball." Similarly, the advertiser can submit a bid of $3 for an advertisement presented with a web page that exactly matches the keyword "baseball." In this situation, the more specific bid can be determined to be the bid associated with the exact match. In turn, the $3 bid can be used when a web page associated with the exact page keyword "baseball" is being auctioned and the $1 bid can be used when a web page that is associated, for example, with the keywords "bat," "homerun" and "catcher." Bid selection based on the specificity of the bid has been provided for example purposes, however, other bid selection processes can be used. Additionally, the general term "bids" has been used for example purposes, but bids submitted by advertisers 102 can be cost per click, maximum cost per click, cost per thousand impressions, or any other bid type.

§4.0 Example User Interface

Figure 2A:
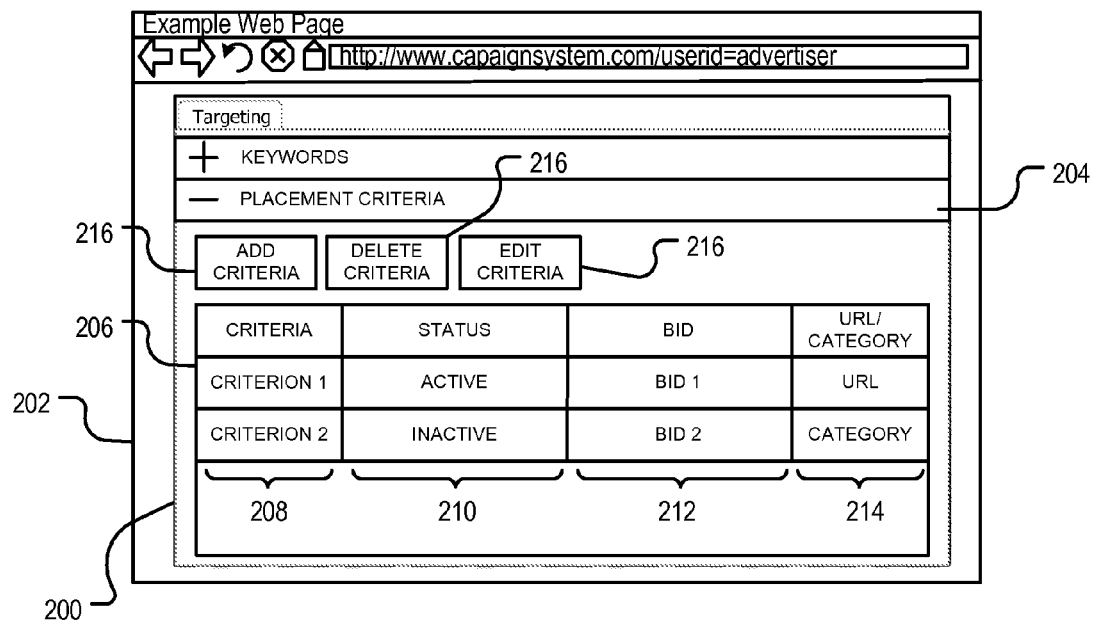
FIGS. 2A-2B are illustrations of an example campaign user interface.
Figure 2B:
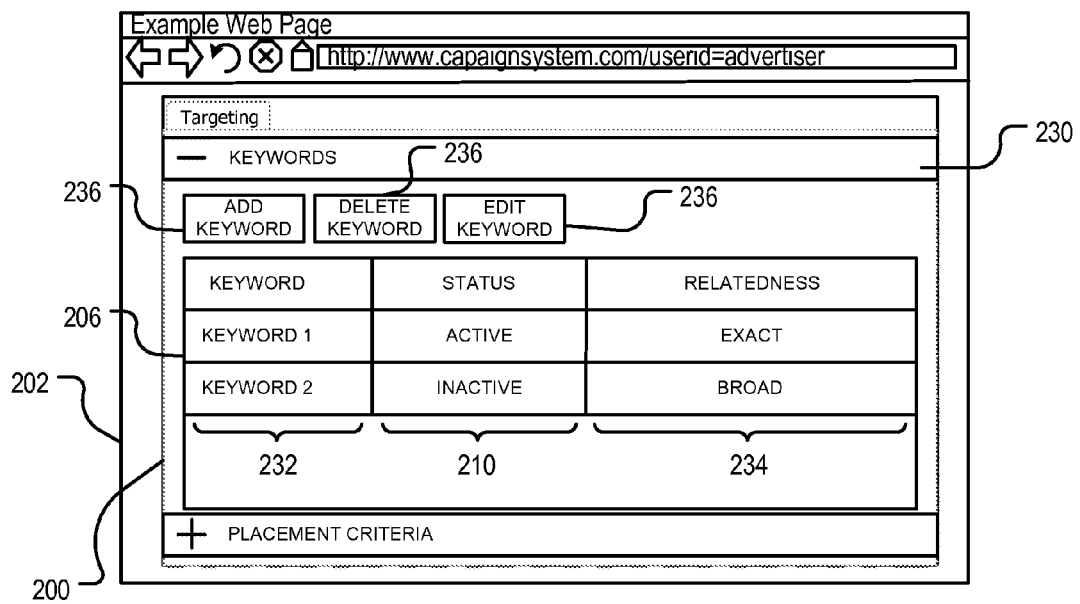

In some implementations, a campaign user interface can be provided that allows the advertiser 102 to manage placement criteria and target keywords. FIGS. 2A-2B are illustrations of an example campaign user interface 200. The example campaign user interface 200 can be provided, for example, on a web page 202 that can be accessed with an internet browser. In some implementations, the campaign user interface 200 can allow an advertiser to manage the placement criteria that is used in connection with the campaign with a placement criteria menu 204. The placement criteria menu 204 can provide, for example, a status window 206 that displays the current placement criteria 208 that have been provided by the advertiser.

Additionally, the placement criteria menu 204 can provide the current status 210 of each of the placement criterion 208. For example, the placement criteria menu 204 can provide a status of "active" for a placement criterion 208 that is currently being used by the campaign. Conversely, the placement criteria menu 204 can provide a status of "inactive" for a placement criterion 208 that is not currently being used by the campaign. The placement criteria menu 204 can also provide the bid 212 that is associated with each placement criterion 208.

In some implementations, the placement criteria menu 204 can provide a URL/category section 214 that presents the URL or category that is associated with the placement criterion 208. For example, if an advertiser provided a URL to define criterion 1, then the placement criteria menu 204 can provide the URL in the URL/category section 214. Similarly, if an advertiser submitted a category to define criterion 2, the placement criteria menu 204 can provide the category in the URL/category section 214, e.g., sports, news, elections).

Criteria management buttons 216 can be provided that allow an advertiser to manage the criteria associated with the campaign. In some implementations, "add criteria," "delete criteria" and "edit criteria" criteria management buttons 216 can be provided that allow an advertiser to manage criteria associated with the campaign.

For example, an advertiser can provide a new URL that identifies a domain that the campaign should target. In this situation, the advertiser can select the "add criteria" button and add the URL as a criterion for the campaign. Conversely, an advertiser can remove criteria that should no longer be associated with the campaign, for example, by selecting the criteria 208 from the status window 206 and selecting the "delete criteria" button. Finally, the advertiser can edit the existing criteria 208 that are associated with the campaign, for example, by selecting the criteria 208 from the status window 206 and selecting the "edit criteria" button. This allows an advertiser to adjust the settings associated with the criteria. For example, if an advertiser selects criterion 1, the advertiser can adjust the bid associated with criterion 1 or change the status of the criterion 1.

In some implementations, the campaign user interface 200 can also allow an advertiser to manage the target keywords that are used in connection with the campaign with a keyword menu 230. The keyword menu 230 can provide, for example, a status window 206 that displays the target keywords 232 that have been provided by the advertiser.

Additionally, the keyword menu 230 can provide a status section 210 that presents the status of each of the target keywords 232. For example, the keyword menu 230 can provide a status of "active" for a target keyword 232 that is currently being used by the campaign. Conversely, the keyword menu 230 can provide a status of "inactive" for a target keyword 232 that is not currently being used by the campaign.

Further, the keyword menu 230 can provide a relatedness section 234 that presents the level of relatedness that the advertiser has specified for the target keywords 232. For example, if an advertiser requires that the page keyword exactly match the target keyword 232 then an "exact" relatedness can be presented. However, if the advertiser has specified that broadly related page keywords satisfy the target keyword 232 then "broad" can be presented in the relatedness section 234 for that target keyword.

In some implementations, keyword management buttons 236 can be provided that allow an advertiser to manage the target keywords 232 associated with the campaign. For example, "add keyword," "delete keyword" and "edit keyword" keyword management buttons 236 can be provided that allow an advertiser to manage the target keywords 232 associated with the campaign.

For example, an advertiser can provide a new target keyword that should be targeted by the campaign. In this situation, the advertiser can select the "add keyword" button and add the keyword as a target keyword for the campaign. Conversely, an advertiser can remove target keywords that should no longer be associated with the campaign, for example, by selecting the keyword 232 from the status window 206 and selecting the "delete keyword" button. Finally, the advertiser can edit the existing target keywords 232 that are associated with the campaign, for example, by selecting the target keyword 232 from the status window 206 and selecting the "edit keyword" button. This allows an advertiser to adjust the settings associated with the target keywords 232. For example, if an advertiser selects keyword 1, the advertiser can adjust the relatedness associated with keyword 1 or change the status of keyword 1.

§5.0 Example Targeting Subsystem

Figure 3:
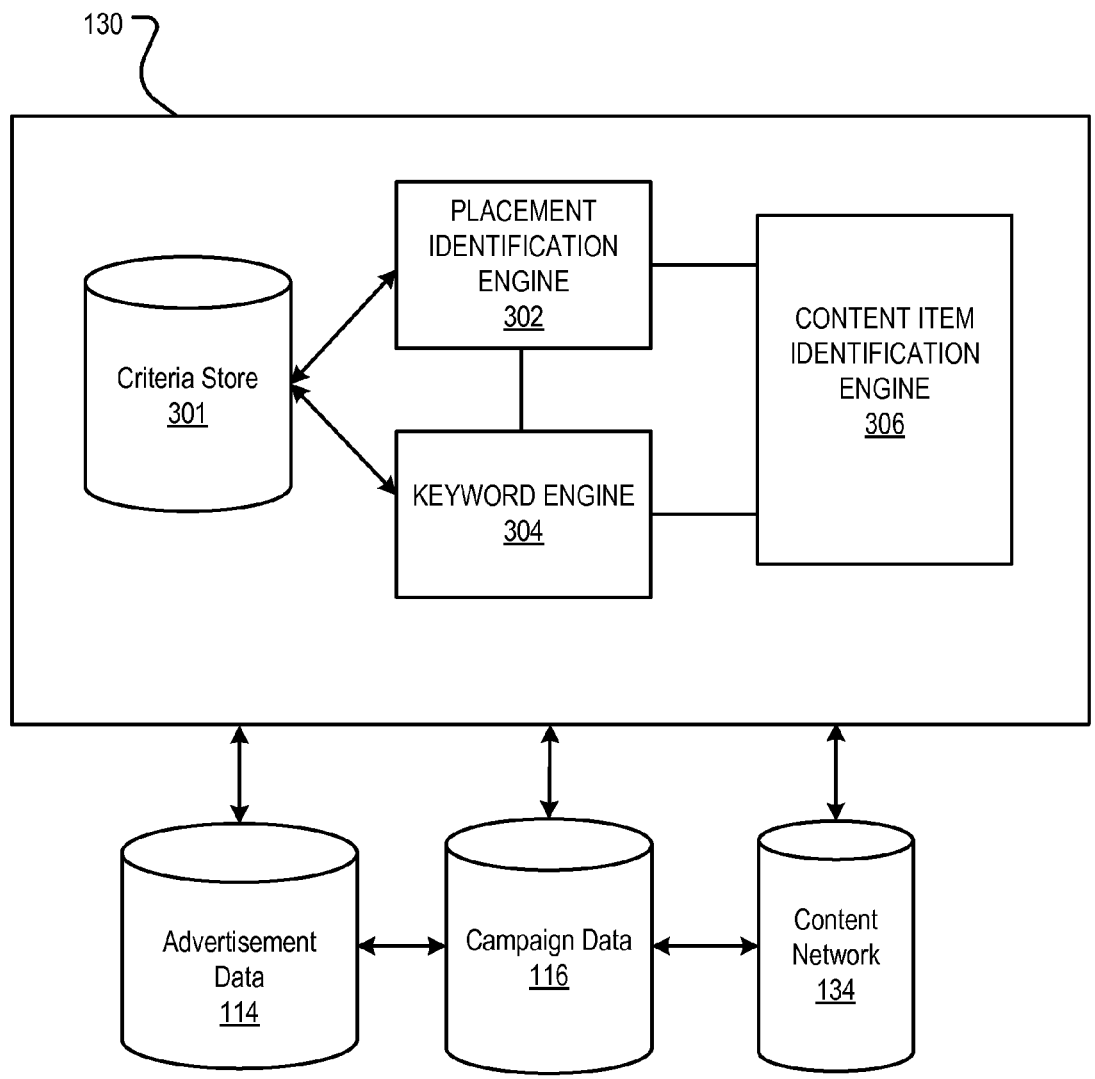
FIG. 3 is a block diagram illustrating an example targeting subsystem.

FIG. 3 is a block diagram illustrating an example targeting subsystem 130. The targeting subsystem 130 can be implemented, for example, in the advertisement management system 104 of FIG. 1. In some implementations, the targeting subsystem 130 can include a criteria store 301, a placement identification engine 302, a keyword engine 304, and a content item identification engine 306. The targeting subsystem 130 can be implemented, for example to facilitate targeting advertising campaigns to publisher properties (e.g., web pages) that satisfy defined criteria (e.g., placement criteria and target keywords).

In some implementations, the criteria store 301 is operable to receive placement criteria as well as target keywords. The placement criteria can include domain features or web page features (e.g., URL, content information, geo-location information, demographic information and website/web page category information). The target keywords can be associated with a topic, for example, that is related to the advertising campaign that is being targeted. The placement criteria and target keywords can be received, for example, from an advertiser through the user interface of FIGS. 2A-2B.

In some implementations, the placement criteria and the keywords are stored in the criteria store 301, and are associated with a campaign that includes a plurality of content items, e.g., advertisements, so that each of the plurality of content items is associated with at least one of the stored placement criteria and one of the stored keywords.

In some implementations, the placement criteria and target keywords can be selected from a list of available placement criteria and target keywords that is provided by the targeting subsystem 130. The targeting subsystem 130 can compile a list of available placement criteria and target keywords, for example, from previously received placement criteria and target keywords and store the list, for example, in the criteria store 131.

Alternatively, the targeting subsystem 130 can compile the list of available placement criteria and target keywords based on the content of the advertisements. The list can be compiled, for example, from attributes that are associated with the advertisement in an index. The attributes of the advertisement can be identified, for example, by evaluating the content of the advertisement. The evaluation and indexing can be performed in a similar manner as web pages, as discussed above.

For example, if an advertisement is for baseball bats, the targeting subsystem 130 can reference the index and identify keywords associated with the advertisement. In turn, the targeting subsystem 130 can provide the keywords associated with the advertisement as the list of available target keywords. The list of available placement criteria can be provided in a similar manner. For example, an evaluation of the advertisement can reveal that the advertisement is a flash advertisement. In turn, the targeting subsystem 130 can determine that flash advertisements perform better on social networking sites based, and suggest social networking websites as a placement criterion for the advertisement Once the targeting subsystem 130 has received the placement criteria and/or target keywords from the advertiser, the targeting subsystem 130 can use this information in various ways to identify advertisements and web pages that should be presented together. For example, the targeting subsystem 130 can identify advertisements that can be presented with a web page when the web page requests an advertisement from the targeting subsystem 130.

§5.1 Identifying Advertisements in Response to an Advertisement Request

In some implementations, the targeting subsystem 130 can identify advertisements that can be presented with a web page in response to a request for advertisements from a web page. In these implementations, the targeting subsystem 130 can identify the placement criteria and target keywords that are satisfied by a property that is requesting advertisements (e.g., a requesting page). In turn, the targeting subsystem 130 can identify advertisements that specify placement criteria and targeting keywords that are satisfied by the requesting page. The order in which placement criteria and keywords are evaluated can vary. For example, in some implementations, the placement criteria satisfied by the requesting page are identified first followed by an identification of the keywords that are satisfied, and advertisements can be selected based on these evaluations. Conversely, in other implementations, keywords that are satisfied by the requesting page are identified first followed by an identification of the placement criteria that are satisfied, and advertisements can be selected based on these evaluations.

The placement identification engine 302 can be operable to identify the placement criteria that are satisfied by a web page that is requesting an advertisement. The placement identification engine 302 can, for example, identify attributes of the web page and compare the identified attributes to the placement criteria that are associated with advertisements. For example, the web page can be evaluated against the stored placement criteria and a subset of the stored placement criteria that is satisfied by the web property can be identified. For example, if a requesting web page has a URL that includes the substring example.com, then the placement identification engine 302 can determine that the web page satisfies a placement criterion requiring the substring example.com.

Likewise, the keyword engine 304 can be operable to identify the target keywords that are satisfied by a requesting page. The keyword engine 304 can identify the target keywords that are satisfied, for example, by comparing the page keywords associated with the requesting page to the target keywords that are stored in the criteria store 301 and determining whether the page keywords are related to the target keywords. For example, the web page can be evaluated against the stored keywords and a subset of the stored keywords that is satisfied by the web property can be identified. Based on the comparison, the keyword engine 304 can determine whether any of the target keywords are satisfied by the requesting page.

In some implementations, an exact match between the target keyword and the page keyword can be required. For example, if the target keyword is "wedding" then the page keyword must also be "wedding" for the web page to be related to the target keyword. In some implementations, the relatedness between the target keyword and the page keyword can be broadened. For example, when a broader relatedness satisfies the target keyword, then other page keywords, for example, "bride," "groom" and "engagement" can be determined to be page keywords that satisfy the target keyword "wedding." Accordingly, web pages that are associated with the page keywords "bride," "groom" and "engagement" can be targeted by a campaign that requires a broad relatedness.

The content item identification engine 306 can be operable to identify advertisements that will be provided with the requesting page to a user device. For example, the content item identification engine 306 can receive a request for an advertisement from a web page. In turn, the content item identification engine 306 can identify the campaigns that have placement criteria and target keywords that are satisfied by the requesting web page, as determined by the placement identification engine 302 and the keyword engine 304, and select an advertisement from one of the satisfied campaigns. The advertisement presented with the requesting page can be selected, for example, according to an auction, as discussed above.

For example, in some implementations the content identification engine 306 can identify one (or more) of the plurality of content items based on the identified subsets of stored placement criteria and stored keywords that are satisfied by the web page. The content identification engine 306 can then provide the identified content item for presentation with the web property, e.g., by providing the content item to a publisher of the web page, or by providing the content item to a client device that has accessed the web page, or by some other provisioning process that facilitate presentation of the content item with the web property.

The placement identification engine 302, the keyword engine 304 and the content item identification engine 306 can be realized by instructions that upon execution cause one or more processing devices to carry out the processes and functions described above. Such instructions can, for example, comprise interpreted instructions, such as script instructions, e.g., JavaScript or ECMAScript instructions, or executable code, or other instructions stored in a computer readable medium. The placement identification engine 302, the keyword engine 304 and the content item identification engine 306 can be implemented separately, or can be implemented as a single software entity. The placement identification engine 302, the keyword engine 304 and the content item identification engine 306 can also be distributively implemented over a network, such as a server farm, or can be implemented in a single computer device.

§6. Example Targeting Process

Figure 4:
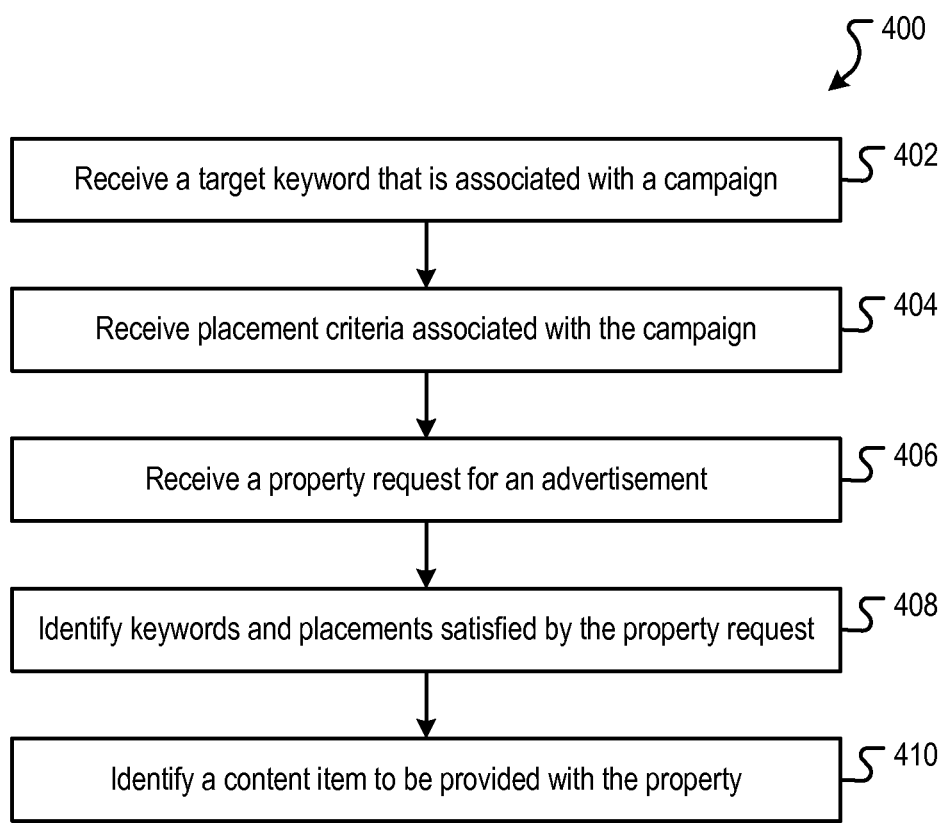
FIG. 4 is a flow chart of an example process of targeting a content item to a web page.

FIG. 4 is a flow chart of an example process 400 of targeting a content item to a web page. The process can be implemented, for example, in the targeting subsystem 130 described in reference to FIG. 3. The process 400 can begin by receiving a target keyword that is associated with a campaign (402). In some implementations, the topic can be related to the products/services that are being advertised by the campaign. The target keyword can be received, for example, from an advertiser through the user interface of FIGS. 2A-2B. The target keywords can be received and stored, for example, by the criteria store 301.

The process 400 can additionally receive placement criteria associated with the campaign (404). The placement criteria can include domain features or web page features (e.g., URL, content information, geo-location information, demographic information and website/web page category information) and can define placements (e.g., web pages, web properties, etc.) that are desired to be targeted by the campaign. The placement criteria can be received, for example, from an advertiser through a user interface of FIGS. 2A and 2B. The placement criteria can be received and stored, for example, by the criteria store 301.

The process 400 can receive a content item request, e.g., an advertisement request (406). The request can define a web property, for example, a web page for which an advertisement is to be served, such as a publisher page, or some other web property. The targeting subsystem 130 can, for example, receive the content item request.

In response to the request, the process 400 can identify keywords and placement criteria satisfied by the web property defined by the request for the advertisement (408). For example, the placement identification engine 302 and the keyword engine 304 can identify keywords and placement criteria satisfied by the web property as described in section 5.1 above.

The process 400 can additionally identify a content item, e.g., an advertisement, to be provided with the web property (410). The content item can be identified based on the content items that are associated with target keywords and placement criteria that are satisfied by the web property, for example. The content item can be identified, for example, by the content item identification engine 306.

The process 400 can optionally identify the content item based on bids that specify a price (or cost per action) an entity is willing to pay to have the content item provided with the web property that has content relevant to the target keyword and that satisfies the placement criteria. The advertisement bid can be a CPC bid, a maximum CPC bid, or a cost per 1000 impressions (CPM) bid, or any other type of advertisement bid. The advertisement bid can be a constant bid that is valid for any identified web page. Alternatively, the advertisement bid can be a bid that varies according to the placement criteria.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a propagated signal or a computer-readable medium. The propagated signal is an artificially generated signal, e.g., a machine-generated electrical, optical, or electromagnetic signal, that is generated to encode information for transmission to suitable receiver apparatus for execution by a computer. The computer-readable medium can be a machine-readable storage device, a machine-readable storage substrate, a memory device, a composition of matter effecting a machine-readable propagated signal, or a combination of one or more of them.

The term "processing device" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this document contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer-implemented method, comprising:
   receiving placement criteria and target keywords for one or more campaigns;
   receiving a content item request that includes data specifying a requesting web property for which a content item is being requested;
   identifying, based on the received placement criteria and by one or more processors, advertisements that are targeted using placement criteria that identify at least one page of the requesting web property, the identification of the advertisements based on the placement criteria being independent of page keywords of the requesting web property;
   selecting, as an advertisement that is eligible to be presented with the requesting web property and by one or more processors, one of the identified advertisements that, in addition to being targeted using the placement criteria, is further targeted using target keywords that are matched by page keywords for the requesting web property; and
   providing, by one or more processors, the selected advertisement in response to the content item request.

2. The method of claim 1, further comprising determining a domain in which the requesting web property is located.

3. The method of claim 2, wherein identifying advertisements comprises identifying advertisements for which presentation of the advertisements with a web property is conditioned, by the placement criteria for the advertisements, on the web property being in the domain.

4. The method of claim 3, wherein identifying advertisements comprises identifying advertisements for which presentation of the advertisements with a web property is conditioned on the web property having a same URL as the requesting web property.

5. The method of claim 1, further comprising determining a category to which the requesting property has been assigned, the category being determined independent of the page keywords for the requesting web property.

6. The method of claim 5 wherein identifying advertisements comprises identifying advertisements for which presentation of the advertisements is conditioned on the requesting web property being assigned to the category.

7. The method of claim 1, wherein selecting one of the identified advertisements as an advertisement that is eligible to be presented with the requesting web property comprises:
   identifying page keywords for the requesting web property;
   identifying target keywords for each of the identified advertisements;
   determining that at least one of the target keywords matches the page keywords; and
   selecting, as the advertisement that is eligible to be presented with the requesting web property, one of the identified advertisements that is targeted using the at least one target keyword.

8. A system comprising:
   a data store storing targeting criteria for a set of advertisements for one or more campaigns, the targeting criteria for each advertisement in the set including:
      placement criteria with which presentation of the advertisement is conditioned independent of page keywords for a web property; and
      target keywords with which presentation of the advertisement is conditioned based on a match existing between one of the target keywords and the page keywords for the web property; and
   one or more computers configured to interact with the data store, the one or more computers being further configured to perform operations comprising:
      receiving the placement criteria and the target keywords for the one or more campaigns;
      receiving a content item request that includes data specifying a requesting web property for which a content item is being requested;
      identifying, based on the received placement criteria, advertisements that are targeted using placement criteria that identify at least one page of the requesting web property, the identification of the advertisements based on the placement criteria being independent of page keywords of the requesting web property;
      selecting, as an advertisement that is eligible to be presented with the requesting web property, one of the identified advertisements that, in addition to being targeted using the placement criteria, is further targeted using target keywords that are matched by page keywords for the requesting web property; and
      providing the selected advertisement in response to the content item request.

9. The system of claim 8, wherein the one or more computers are further configured to perform operations comprising determining a domain in which the requesting web property is located.

10. The system of claim 9, wherein the one or more computers are further configured to perform operations comprising identifying advertisements for which presentation of the advertisements with a web property is conditioned, by the placement criteria for the advertisements, on the web property being in the domain.

11. The system of claim 10, wherein the one or more computers are further configured to perform operations comprising identifying advertisements for which presentation of the advertisements with a web property is conditioned on the web property having a same URL as the requesting web property.

12. The system of claim 8, wherein the one or more computers are further configured to perform operations comprising determining a category to which the requesting property has been assigned, the category being determined independent of the page keywords for the requesting web property.

13. The system of claim 12, wherein the one or more computers are further configured to perform operations comprising identifying advertisements for which presentation of the advertisements is conditioned on the requesting web property being assigned to the category.

14. The system of claim 8, wherein the one or more computers are further configured to perform operations comprising:
   identifying page keywords for the requesting web property;
   identifying target keywords for each of the identified advertisements;
   determining that at least one of the target keywords matches the page keywords; and
   selecting, as the advertisement that is eligible to be presented with the requesting web property, one of the identified advertisements that is targeted using the at least one target keyword.

15. A non-transitory computer storage medium encoded with a computer program, the program comprising instructions that when executed by one or more computers cause the one or more computers to perform operations comprising:
   receiving placement criteria and target keywords for one or more campaigns;
   receiving a content item request that includes data specifying a requesting web property for which a content item is being requested;
   identifying, based on the received placement criteria, advertisements that are targeted using placement criteria that identify at least one page of the requesting web property, the identification of the advertisements based on the placement criteria being independent of page keywords of the requesting web property;
   selecting, as an advertisement that is eligible to be presented with the requesting web property, one of the identified advertisements that, in addition to being targeted using the placement criteria, is further targeted using target keywords that are matched by page keywords for the requesting web property; and
   providing the selected advertisement in response to the content item request.

16. The computer storage medium of claim 15, wherein the instructions further cause the one or more computers to perform operations comprising determining a domain in which the requesting web property is located.

17. The computer storage medium of claim 16, wherein the instructions further cause the one or more computers to perform operations comprising identifying advertisements for which presentation of the advertisements with a web property is conditioned, by the placement criteria for the advertisements, on the web property being in the domain.

18. The computer storage medium of claim 17, wherein the instructions further cause the one or more computers to perform operations comprising identifying advertisements for which presentation of the advertisements with a web property is conditioned on the web property having a same URL as the requesting web property.

19. The computer storage medium of claim 15, wherein the instructions further cause the one or more computers to perform operations comprising determining a category to which the requesting property has been assigned, the category being determined independent of the page keywords for the requesting web property.

20. The computer storage medium of claim 19, wherein the instructions further cause the one or more computers to perform operations comprising identifying advertisements for which presentation of the advertisements is conditioned on the requesting web property being assigned to the category.

21. The computer storage medium of claim 15, wherein the instructions further cause the one or more computers to perform operations comprising:
   identifying page keywords for the requesting web property;
   identifying target keywords for each of the identified advertisements;
   determining that at least one of the target keywords matches the page keywords; and
   selecting, as the advertisement that is eligible to be presented with the requesting web property, one of the identified advertisements that is targeted using the at least one target keyword.

* * * * *